Dec. 26, 1939.  W. S. MACDONALD  2,184,620
MEASURING AND RECORDING INSTRUMENT
Filed July 31, 1937
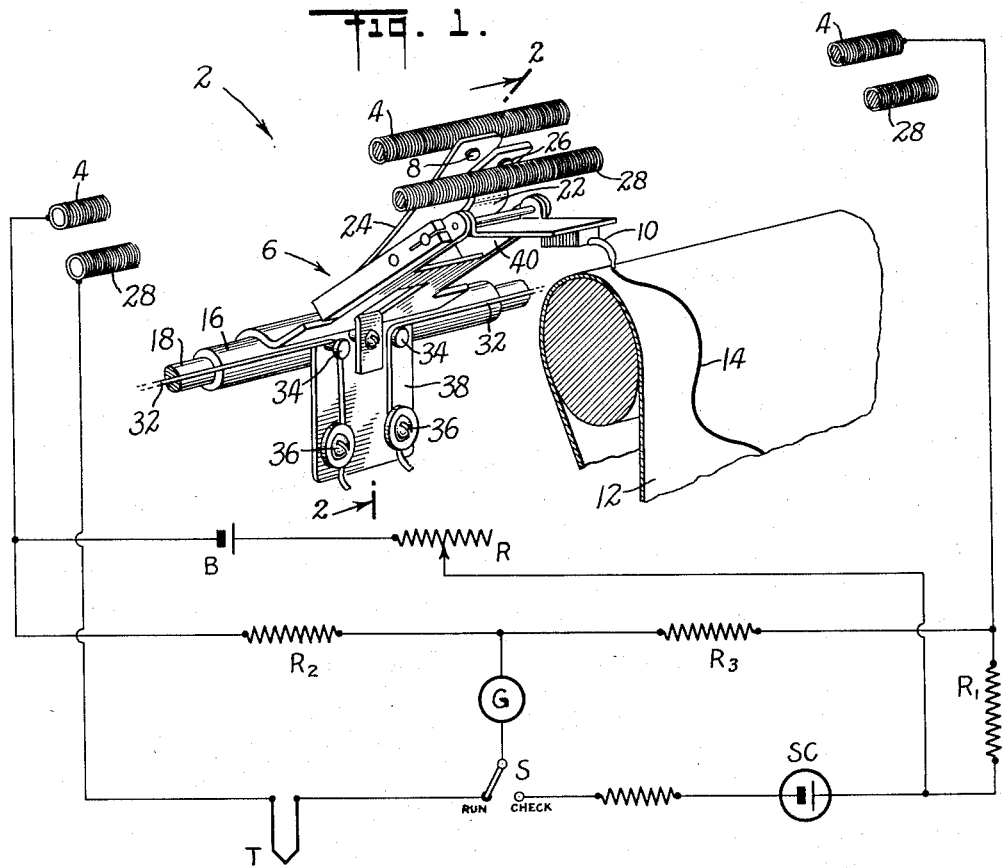
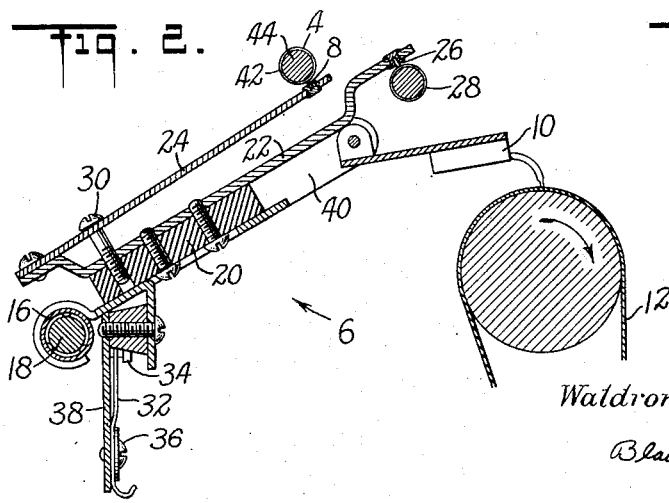
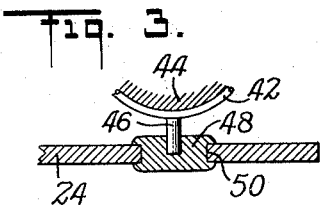
INVENTOR
Waldron Shapleigh Macdonald
BY
Blair, Curtis, Dunne & Hayward
ATTORNEYS Patented Dec. 26, 1939

2,184,620

UNITED STATES PATENT OFFICE 2,184,620

MEASURING AND RECORDING INSTRUMENT

Waldron Shapleigh Macdonald, Foxboro, Mass., assignor to The Foxboro Company, Foxboro, Mass., a corporation of Massachusetts Application July 31, 1937, Serial No. 156,615

1 Claim. (Cl. 201—55)

This invention relates to electrical measuring and recording instruments and more particularly to slide wire contacts for use in such instruments.

In certain types of electrical measuring instruments such as self-balancing potentiometer or Wheatstone bridge instruments an electrical circuit is unbalanced by variations in the value of a condition and returned to balance by moving a sliding contact along a slide wire resistance. In instruments of this type it is desirable that the relationship between the sliding contact and the slide wire, i. e., their relative positions, the area of contact, the contact pressure, etc., be substantially constant so that the contact resistance will always be uniform thus maintaining the accuracy of the indication or record. This presents a difficult problem in electrical contact design, and a problem which is even more acute in instruments in which the sliding contact is moving almost continuously, as in multi-record potentiometer recorders of the type illustrated in the patent application of Frank Moore, Serial No. 9,655, filed March 6, 1935. In such instruments one potentiometer circuit is used and a single slide wire contact carriage supporting a printing mechanism moves back and forth across the slide wire to make records of the temperatures of many conditions. In normal operation the slide wire contact may be caused to move back and forth almost continuously through the entire length of the slide wire resistance, thus causing the slide wire contact to wear considerably.

The slide wires in such instruments usually comprise a rod upon which the resistance wire is spirally wound. In the past, as shown for example in Figure 12 of the above-mentioned patent application to Frank Moore, it has been customary to make contact with such slide wires by means of a steel cylinder which is pressed against the slide wire in such a way that the longitudinal axes of the contact and slide wire are perpendicular to each other but in different planes. Under some circumstances such a contact arrangement is not entirely satisfactory because the area of contact, which initially is practically a point contact touching only one or two turns, increases rapidly with wear until finally it overlaps many turns of the slide wire. This necessitates frequent replacement of the contact cylinder in order to maintain the contact area, and thus the instrument accuracy, reasonably constant.

It is an object of this invention to provide simple, uniform and durable slide wire contacts for use in instruments of this type.

Other objects and advantages of this invention will be in part apparent and in part pointed out hereinafter, and may be more readily understood by referring to the accompanying drawing in which:

Figure 1 shows schematically the circuit diagram of an electrical measuring device, including a portion of the device shown in perspective with certain of the details broken away or entirely omitted, to show more simply a mechanism embodying the invention;

Figure 2 is a vertical section taken on line 2—2 of Figure 1; and,

Figure 3 is an enlarged portion of the section shown in Figure 2.

In the embodiment shown in the drawing, contact is made with the slide wire by means of a cylindrical contact made of suitable metal resiliently mounted with respect to the slide wire so that the longitudinal axis of the contact is perpendicular to and intersects the longitudinal axis of the slide wire. With such an arrangement the contact area remains substantially constant regardless of the amount of wear of the contact cylinder.

Referring to Figure 1 of the drawing, a portion, generally indicated at 2, of an electrical temperature measuring instrument of the type disclosed in the above-identified patent application of Frank Moore, is shown connected in a potentiometer circuit. A battery B is connected across a fixed electrical resistance in the form of a slide wire 4 in series with a variable resistance R and a current limiting resistance $R_1$. A thermocouple T is positioned so as to be responsive to the temperature of the condition being measured. The voltage of the thermocouple T is opposed to the voltage existing across a variable portion of slide wire 4 determined by the position of a sliding contact 8. A galvanometer G is connected in the circuit through a cold junction compensating resistance $R_2$ and a standardizing resistance $R_3$, and is responsive to any difference in these two voltages. A translating mechanism (not shown), sensitive to the deviation of the galvanometer G from its null position, actuates a reversible driving means (not shown) to drive a movable carriage, generally indicated at 6, carrying the contact 8 along the slide wire 4 in the proper direction to tend to reduce the difference in these two voltages to zero. The position of the slider carriage 6 along the slide wire 4 indicates the amount of resistance required in the circuit to balance the influence of the thermocouple and thus the position of the slider carriage may be directly calibrated to indicate the temperature measured by the thermocouple T. A pen 10 is mounted to move with the slider carriage 6 crosswise of a chart 12 to record thereon the temperature being measured, as shown at 14. The customary standard cell SC and check switch S are provided for checking the calibration of the instrument. The mechanisms for translating the galvanometer position, for moving the slider carriage 6, for driving the chart 12, etc., do not form part of this invention and will not be described herein. They are shown and described in the above-identified Frank Moore application to which reference may be made for details of their construction.

The slider carriage 6 shown in Figures 1 and 2 comprises a tubular guide member 16 which partially surrounds and slides along a guide rod 18. A block 20 of suitable material is attached to the member 16 by a metal strip partially encircling member 16 and projecting therefrom, and block 20 in turn supports a rigid arm 22 shaped substantially as shown in Figure 2. A second arm 24 formed of resilient sheet material is rigidly attached to one end of the arm 22. The other ends of arms 24 and 22 carry contacts 8 and 26 which ride on slide wire 4 and on a contact rod 28 through which the sliding contact is connected to the potentiometer circuit. The two interconnected metal arms 24 and 22 and contacts 8 and 26 form a slidable electrical connection between slide wire 4 and the contact rod 28. The resilient arm 24 is so designed that it tends to bend away from the arm 22 and, as the carriage assembly 6 is freely rotatable about the guide bar 18, it causes approximately equal contact pressure to be exerted on the slide wire 4 by contact 8 and on the contact bar 28 by contact 26. A screw 30 passes through arm 24 and is threaded into a hole in the arm 22 to permit this contact pressure to be adjusted as desired. The slider carriage 6 is moved along guide rod 18 by means of a belt 32 which is driven by the above-mentioned reversible driving means (not shown). The ends of belt 32 pass over pins 34 and are attached by screws 36 to a plate 38 which is rigidly secured to the guide member 16 and extends downwardly therefrom. The pen 10 is pivotally attached to an arm 40 which is secured to and extends forwardly from the block 20 over the chart 12.

The slide wire 4 is formed by spirally winding a suitable resistance wire 42, such as manganin, on a metal rod 44. Each turn is insulated from the next and from the rod by suitable insulation material such, for example, as shellac. The contact rod 28, extending parallel to the slide wire 4, may be a plain round metal rod, but it is preferable that it be a metal rod spirally wound with wire similar to slide wire 4 except that no insulation is used between the turns and the rod so that it forms a substantially unipotential surface. Such a construction of the contact rod is desirable because, when using a slider carriage of the type above described which provides approximately equal contact pressure on the slide wire and the contact bar, it is readily apparent that it is advantageous to have the contact bar of a construction similar to that of the slide wire so that the sliding friction on both of these members is approximately equal, thus providing uniform contact conditions at both contact points at all times and minimizing the effect of the parasitic thermo-electric E. M. F.'s developed at these points which impair the accuracy of the temperature record.

Contacts 8 and 26 are so constructed that contact is made with the slide wire 4 and contact rod 28 by means of cylindrical metal studs made of suitable metal resiliently mounted with respect to the slide wire and contact rod so that the longitudinal axes of the contact cylinders are perpendicular to and intersect the longitudinal axes of the slide wire and contact rod whereby a substantially constant contact area is always presented to the slide wire and contact rod in spite of wear of the contact faces.

The diameter of the contact cylinder is chiefly dependent upon the diameter of the resistance wire wound on the slide wire. The diameter of the contact should be such that it always touches the same number of turns and not alternately one more or less as it moves along the slide wire. It is preferable that the diameter of the contact cylinder be slightly less than the distance on the slide wire covered by two turns of the resistance wire wound thereon, so that the contact rides from one slide wire turn to the next without dropping between the turns and thus varying the area of the contacting surface and thus the contact pressure. It is possible, of course, to have the diameter of the contact such that it will touch three or more turns of the slide wire simultaneously. This is not desirable, however, because it not only decreases the contact pressure per unit area thus causing poor contact, but also impairs the accuracy of the instrument.

Contact 8 is made as shown in Figure 3. A small metallic cylinder 46 of suitable material is molded into a base 48 of softer metal as, for example, brass, which in turn is force-fitted into a hole 50 in the spring arm 24. The portion of the metal 48 extending beyond the hole 50 in arm 24 is staked down so as to overlap it and thus rigidly attach base 48 thereto. Contact 26 is formed in a similar manner.

The cylinder 46 may be of any suitable contact material which does not tend to corrode. Gold has proven quite satisfactory but is subject to too rapid wear. Cylinders made of platinum-iridium alloy are preferable and have given very satisfactory results, contact wear being extremely small and no difficulties being encountered with rusting, corroding, etc. In the present embodiment an 80% platinum-20% iridium alloy is used, but this percentage may be varied depending upon the conditions of use.

As many embodiments may be made in the above invention and as many changes may be made in the embodiment above described, it is to be understood that all matter hereinbefore set forth as shown in the accompanying drawing is to be interpreted as illustrative only and not in a limiting sense.

I claim:

In an electrical condition measuring instrument of the type wherein a sliding contact is moved along a resistance element, a sliding contact member including a small contact stud of relatively hard metal, a contact-supporting base of relatively soft metal having a large diameter relative to the thickness of said contact stud, one end of said contact stud being embedded in said contact-supporting base, a contact-positioning metal strip having a hole in one end thereof of a diameter approximately equal to that of said contact-supporting base, said contact-supporting base being fitted into the hole in said contact-positioning strip to form an integral part thereof and being so positioned that said contact stud projects in a direction approximately perpendicular to said contact-positioning strip to make contact with said resistance element, and the edges of said contact-supporting base being spread over the edges of the hole in said contact-positioning strip on both sides thereof.

WALDRON S. MACDONALD.